J. W. HARTLEY.
SEWAGE DISTRIBUTER.
APPLICATION FILED JUNE 5, 1908.
904,324.
Patented Nov. 17, 1908.
4 SHEETS—SHEET 1.
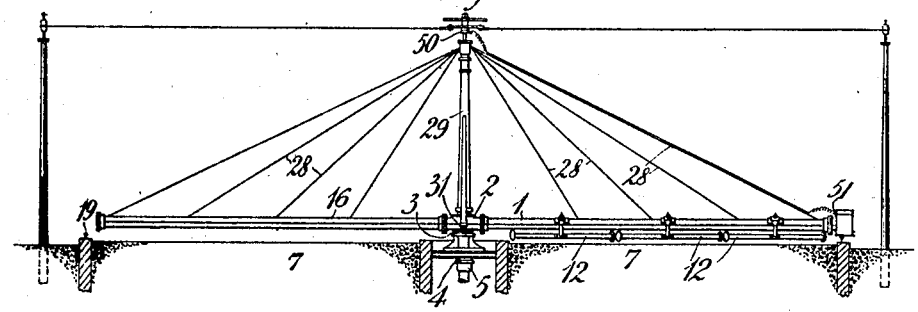
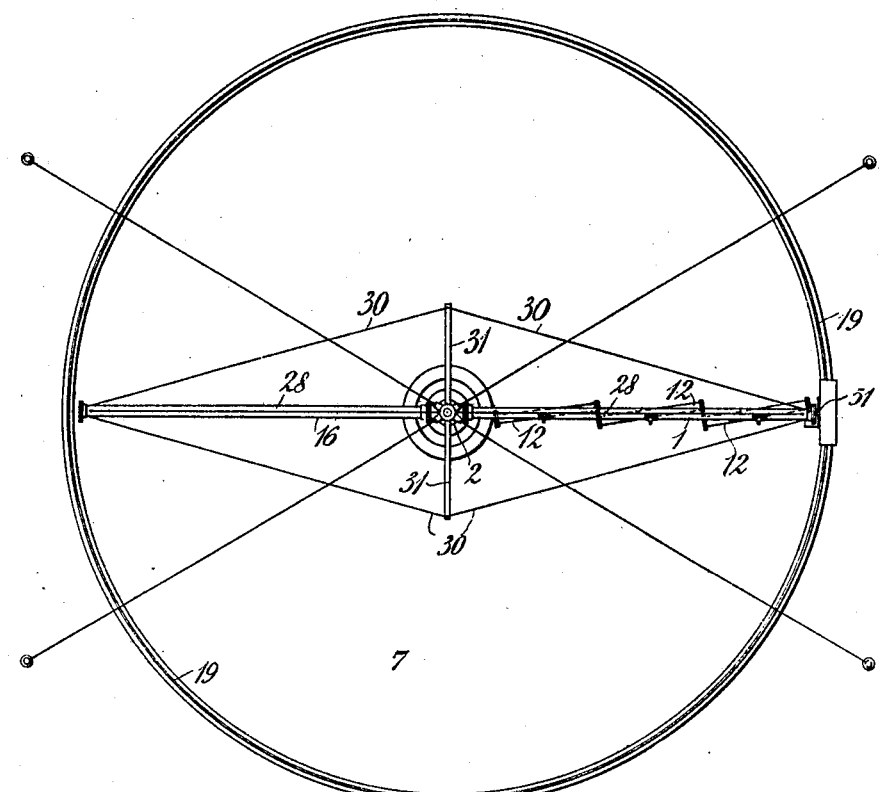
Witnesses.—
A. H. Rabsag,
R. N. Butler
Inventor.—
J. W. HARTLEY,
by H. C. Evert & Co.
attorneys J. W. HARTLEY.
SEWAGE DISTRIBUTER.
APPLICATION FILED JUNE 5, 1908.
904,324.
Patented Nov. 17, 1908.
4 SHEETS—SHEET 2.
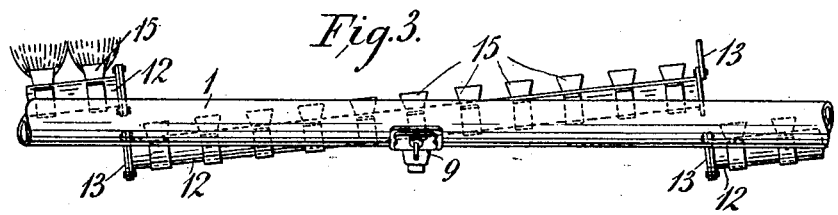
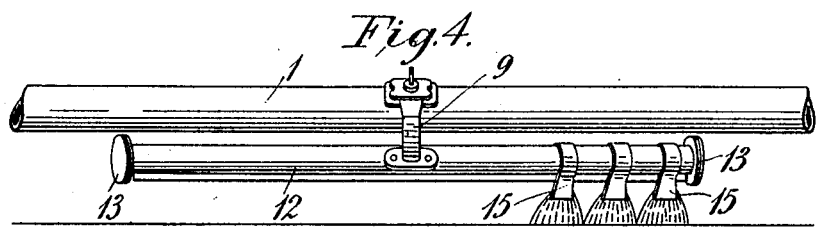
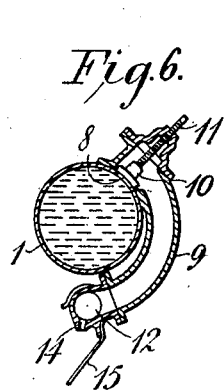
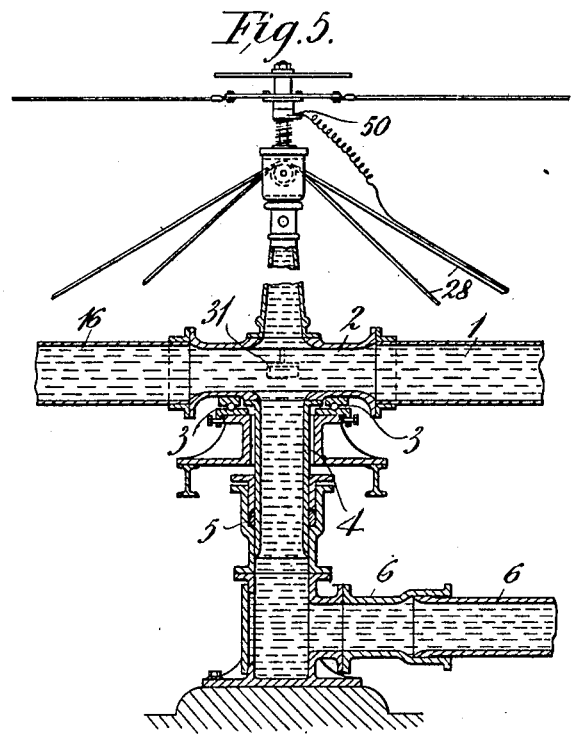
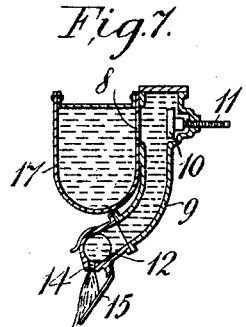
Witnesses—
A. H. Rabsay,
R. N. Butler
Inventor:—
J. W. HARTLEY,
by H. C. Evert & Co.
attorneys.

J. W. HARTLEY.
SEWAGE DISTRIBUTER.
APPLICATION FILED JUNE 5, 1908.
904,324.
Patented Nov. 17, 1908.
4 SHEETS—SHEET 3.
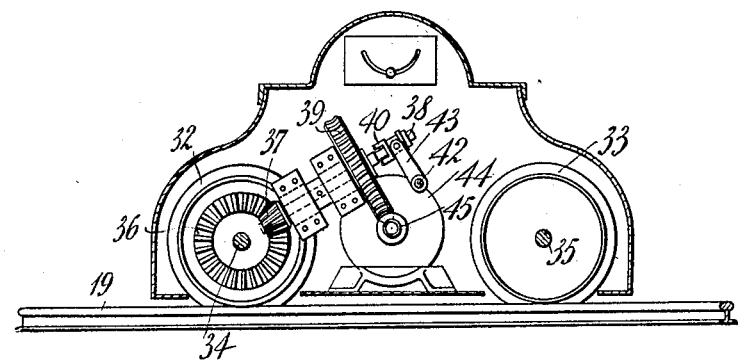
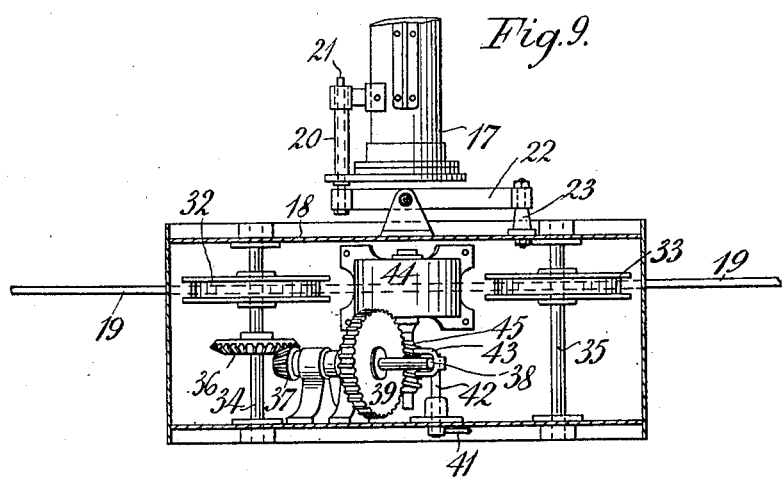
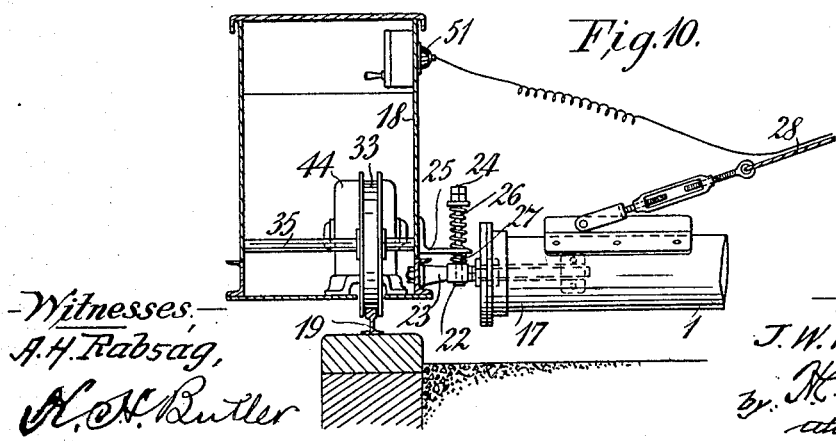
Witnesses:
A. H. Rabsag,
K. H. Butler
Inventor:
J. W. HARTLEY,
by K. Evert & Co.
attorneys.

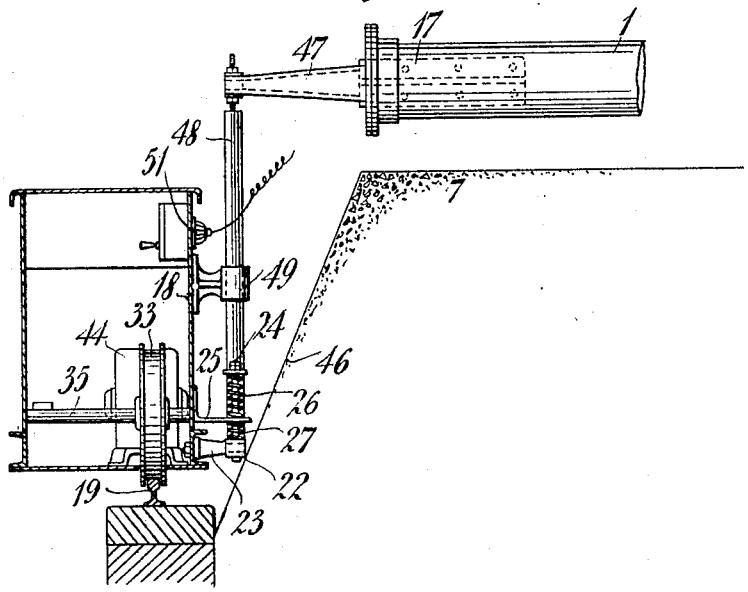
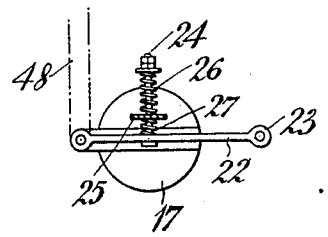

UNITED STATES PATENT OFFICE.

JOHN WILLIAM HARTLEY, OF STOKE-UPON-TRENT, ENGLAND.

SEWAGE-DISTRIBUTER.

No. 904,324.  Specification of Letters Patent.  Patented Nov. 17, 1908.

Application filed June 5, 1908. Serial No. 436,920.

*To all whom it may concern:*

Be it known that I, JOHN WILLIAM HARTLEY, subject of His Majesty the King of Great Britain and Ireland, residing at Stoke-upon-Trent, in the county of Stafford, England, have invented certain new and useful Improvements in Sewage-Distributers, of which the following is a specification, reference being had therein to the accompanying drawings.

This invention relates to improvements in sewage distributers of that kind which rotate upon a central pivot and distribute sewage on a circular bacteria bed by means of one or more tubes radiating from the center of the bed.

This invention has for object to provide improved means for regulating the rate at which sewage is supplied to the various portions of said bed; to facilitate the cleaning of the distributing members; to balance the distributer more effectually with reference both to weight and wind pressure; and to provided improved means for effecting its rotation.

This invention is hereinafter described with reference to the accompanying drawings; wherein Figure 1 is an elevation of the distributer; Fig. 2 is a plan of the same; Figs. 3 and 4 are respectively a top plan and a side elevation of a portion of a distributing tube thereof; Fig. 5 is a sectional elevation of the central pivotal portion of the distributer, the central column and guy ropes whereof being shown broken; Fig. 6 is a transverse section through a distributing tube of circular cross-sectional form; Fig. 7 is a similar section through a modified construction of distributing tube of U-shaped cross-sectional form; Fig 8, is a side elevation of an electrically propelled carriage for rotating the distributer; Figs. 9 and 10 are respectively a top plan and an end elevation of the same, its casing being shown in section, and its connection with the rotary distributing tube being likewise shown; Fig. 11 is a view similar to Fig. 9, but showing a modified method of connecting said carriage with said tube; and Fig. 12 is a detail view illustrating the connection between the end of the distributing tube and its propelling carriage.

Each main distributing tube 1 is secured to a central casting 2 which rests upon a ball bearing 3 and has a tube 4 passing through a stuffing box 5 which is connected to the central supply pipe 6 of the bacteria bed 7. To outlets 8 (Figs. 6 and 7) formed in the tube 1 there are secured connecting pipes 9 provided with valves 10 which can each be opened or closed by a screw 11. In Fig. 6 the valves 10 are shown closed, while in Fig. 7 they are shown open. Attached to the lower end of each pipe 9 is a sectional distributing pipe 12, Figs. 1, 2 and 3, having readily removable covers 13 at each end thereof, these pipes 12 being arranged in echelon or obliquely with respect to the tube 1 as shown in Fig. 3. Suitable outlet holes 14 are made in each pipe 12 and baffle plates or spreaders 15 of sheet metal are placed below these holes to spray the jets of sewage. These sectional pipes 12 are shown in Fig. 1 but the number of such pipes may vary according to the size of the distributer, each pipe being suitably about 6 feet in length.

The balance tube or arm 16 is connected to the central casting or junction 2 and extends from the center opposite to and in line with distributing tube 1. When the distributer is at work, the arm 16 being made large enough, balances the main tube 1 and the sectional pipes 12 with respect both to weight and wind pressure. As the flow of sewage through each sectional pipe 12 can be increased, decreased or stopped entirely, it follows that each section of the bed over which any one sectional pipe 12 travels is under perfect control as regards the quantity of sewage to be distributed thereon.

The rotation of the distributer is effected by means of the electrically propelled carriage 18 running on the circular monorail track 19. The carriage is connected with the distributer as follows:—To the outer end 17 of the distributing tube 1, there is attached a socket 20 (Figs. 9 and 10) having its axis radial with the circular bacteria bed 7. Within the socket 20 is a sliding bolt 21 attached to the end of a lever 22, pivoted on a stud 23 on the side of the motor carriage 18. The lever 22 carries a bolt 24 which passes through a bracket 25 attached to the motor carriage 18, and also through a helical spring 26 above the bracket 25 and a helical spring 27 below this bracket. When the outer end 17 of the tube 1 presses downward, being heavier than its balance arm 16, the spring 26 is compressed by the lever 22, and when the end 17 rises on account of the tube 1 being lighter than balance arm 16, the spring 27 is compressed, the lever 22 thus taking a portion of the weight of the motor carriage 18. The tubes 1 and 16 are supported against gravity by guy ropes 28 which pass over or are connected to the central column 29 and are attached to the tubes 1 and 16. When only a single tube 1 and balance tube 16 are provided these tubes are stiffened sidewise by guy ropes 30 arranged in a horizontal plane, and attached to two horizontal struts 31, one extending on each side from the central junction pipe 2, the struts 31 being stayed with diagonal guys similar to the guys 28. The motor carriage wheels 32 and 33 are keyed upon axles 34 and 35 and travel on rail 19. The axle 34 is driven by a pair of bevel wheels 36 and 37, bevel wheel 36 being keyed on the shaft 34 and bevel wheel 37 on the shaft 38. A worm wheel 39 runs loosely on the shaft 38 and is furnished with a crab clutch 40 which is engaged or disengaged by a lever 41 on the outside of the motor carriage through a rod 42 and lever 43. The electric motor 44 has keyed upon its shaft a worm 45 geared into worm wheel 39. The clutch 40 is disengaged for starting up the motor.

Fig. 11 shows the application of my improved distributer to a bacteria bed 7, the surface of which is raised above the wall carrying the rail 19. The line 46 shows the angular face of the bacteria bed. A bracket 47 extends from the end 17 of the distributing pipe and carries a rod 48 that slides through a guide 49 fixed on the side of the motor carriage 18. The lower end of the rod 48 is connected to the end of the lever 22 (Fig. 12) and transmits the weight of the end 17 of the tube to the springs 26 and 27 as already described in connection with the sliding bolt 21. The springs 26 and 27 may sometimes be dispensed with, the lever 22 being used as a drag link only. The electrical wires for supplying the motor 44 are connected to contact 50 (Figs. 1 and 5) the wires being continued along the guy ropes 28 to motor 51.

In small sized bacteria beds a single tube 1 and balancing arm 16 will suffice, but two or more such radially arranged tubes and arms may obviously be provided when desirable. The details herein shown and described may, moreover, be considerably modified while still within the scope of my invention.

What I claim is:—

1. In a sewage distributer the combination of a main distributing tube, one or more auxiliary distributing pipes connected with and located below said main distributing tube and arranged obliquely thereto, and a regulating cock for each auxiliary distributing pipe.

2. In a sewage distributer the combination of a main distributing tube, one or more auxiliary distributing pipes connected with and located below said main distributing tube and arranged obliquely thereto, a regulating cock for each auxiliary distributing pipe, and a non-distributing balancing arm.

3. In a sewage distributer the combination of a main distributing tube, one or more auxiliary distributing pipes located below and connected with said main distributing tube and arranged obliquely thereto and having orifices for sewage discharge, below each such orifice a baffle plate or sprayer, and a regulating cock for each auxiliary distributing pipe.

4. In a sewage distributer the combination of a main distributing tube, one or more auxiliary distributing pipes located below and connected with said main distributing tube and arranged obliquely thereto and having orifices for sewage discharge, below each such orifice a baffle plate or sprayer, and a regulating cock for each auxiliary distributing pipe, and a tubular non-distributing arm arranged radially opposite said main distributing tube.

5. In a sewage distributer the combination of a circular monorail track, an electric motor carriage adapted to run thereon, a radially movable distributing tube, and means for connecting said carriage with the outer end of said tube.

6. In a sewage distributer the combination of a circular monorail track, an electric motor carriage adapted to run thereon, a radially movable distributing tube, and means for connecting said carriage with the outer end of said tube, comprising a socket on said tube, a bolt adapted to slide in said socket, a lever pivoted on said carriage and connected at one end with said bolt, a second bolt rigidly connected with said lever, on said carriage a bracket through which last mentioned bolt passes and above and below said bracket helical springs arranged around last-mentioned bolt.

In testimony whereof I affix my signature in the presence of two witnesses.

JOHN WILLIAM HARTLEY.

Witnesses:
 FREDK. BARRATT,
 JOHN H. COPESTATTO.